US011377366B2

(12) United States Patent
Kahn et al.

(10) Patent No.: US 11,377,366 B2
(45) Date of Patent: Jul. 5, 2022

(54) PROCESS FOR THE PREPARATION OF NANOPARTICLES

(71) Applicants: CENTRE NATIONAL DE LA RECHERCHE SCIENTIFIQUE, Paris (FR); INSTITUT NATIONAL POLYTECHNIQUE DE TOULOUSE, Toulouse (FR); UNIVERSITE TOULOUSE III—PAUL SABATIER, Toulouse (FR)

(72) Inventors: Myrtil Kahn, Toulouse (FR); Yohan Champouret, Toulouse (FR); Richard Clergereaux, Montabrier (FR); Constantin Vahlas, Toulouse (FR); Anne-Francoise Mingotaud, Toulouse (FR); Guillaume Carnide, Toulouse (FR)

(73) Assignees: CENTRE NATIONAL DE LA RECHERCHE SCIENTIFIQUE, Paris (FR); INSTITUT NATIONAL POLYTECHNIQUE DE TOULOUSE, Toulouse (FR)

( * ) Notice: Subject to any disclaimer, the term of this patent is extended or adjusted under 35 U.S.C. 154(b) by 603 days.

(21) Appl. No.: 16/319,657

(22) PCT Filed: Jul. 26, 2017

(86) PCT No.: PCT/EP2017/068831
§ 371 (c)(1),
(2) Date: Jan. 22, 2019

(87) PCT Pub. No.: WO2018/019862
PCT Pub. Date: Feb. 1, 2018

(65) Prior Publication Data
US 2021/0276882 A1    Sep. 9, 2021

(30) Foreign Application Priority Data

Jul. 27, 2016 (EP) ..................................... 16305977

(51) Int. Cl.
*C01G 41/02* (2006.01)
*B01J 4/00* (2006.01)
(Continued)

(52) U.S. Cl.
CPC .............. *C01G 41/02* (2013.01); *B01J 4/002* (2013.01); *B01J 10/00* (2013.01); *B01J 19/06* (2013.01);
(Continued)

(58) Field of Classification Search
CPC . B01J 19/06; B01J 10/00; B01J 4/002; C01G 41/02; C01G 19/02; C01G 3/02;
(Continued)

(56) References Cited

U.S. PATENT DOCUMENTS 5,874,134 A     2/1999  Rao et al.
2006/0083694 A1  4/2006  Kodas et al.
(Continued)

OTHER PUBLICATIONS

European Search Report dated Dec. 7, 2016.

*Primary Examiner* — Patrick D Niland (57) ABSTRACT

The present invention relates to a "safety-by-design" method for the preparation of nanoparticles, to a method for the preparation of a nanocomposite material, and to the use of a direct liquid injection device so as to prepare nanoparticles or nanocomposite materials in a "safety-by-design" process.

19 Claims, 5 Drawing Sheets

(51) Int. Cl.
    *B01J 10/00*     (2006.01)
    *B01J 19/06*     (2006.01)
    *C01G 3/02*     (2006.01)
    *C01G 9/02*     (2006.01)
    *C01G 19/02*     (2006.01)
    *C08J 3/20*     (2006.01)
    *C08K 3/22*     (2006.01)
    *C01G 9/03*     (2006.01)

(52) U.S. Cl.
    CPC ................ *C01G 3/02* (2013.01); *C01G 9/02* (2013.01); *C01G 9/03* (2013.01); *C01G 19/02* (2013.01); *C08J 3/203* (2013.01); *C08K 3/22* (2013.01); *C01P 2002/84* (2013.01); *C01P 2004/04* (2013.01); *C01P 2004/52* (2013.01); *C01P 2004/64* (2013.01); *C08K 2003/2231* (2013.01); *C08K 2003/2248* (2013.01); *C08K 2003/2258* (2013.01); *C08K 2003/2296* (2013.01); *C08K 2201/011* (2013.01)

(58) Field of Classification Search
    CPC ......... C01G 9/02; C01G 9/03; C01P 2004/64; C01P 2004/04; C01P 2002/84; C01P 2004/52; C08J 3/203; C08K 3/22; C08K 2003/2258; C08K 2201/011; C08K 2003/2296; C08K 2003/2231; C08K 2003/2248
    See application file for complete search history.

(56) References Cited

U.S. PATENT DOCUMENTS

2011/0027475 A1     2/2011     Rajala et al.
2014/0034751 A1*   2/2014     Guillon ............. C23C 16/45512
                                                             239/74

* cited by examiner

PROCESS FOR THE PREPARATION OF NANOPARTICLES

RELATED APPLICATION

This application is a National Phase of PCT/EP2017/068831, filed on Jul. 26, 2017, which claims the benefit of priority from European Patent Application No. 16 305 977.7, filed on Jul. 27, 2016, the entirety of which are incorporated by reference.

The present invention relates to a method for the preparation of nanoparticles, to a method for the preparation of a nanocomposite material, and to the use of a direct liquid injection device so as to prepare nanoparticles or nanocomposite materials in a "safety-by-design" process.

DESCRIPTION OF RELATED ART

Nanoparticles and nanocomposite materials can exhibit properties that differ substantially from those of bulk materials. There are therefore currently attracting increasing attention in various fields of industry for a wide range of applications (e.g. electroluminescent diodes, optical switches, optical fibers, transistors, field emission devices, smart windows, filters, colored glasses, solar cells, batteries, fuel cells, sensors, ice or smoke detectors, protective, corrosion-resistant, fire-resistant, chemically-resistant, self-cleaning, high-friction and/or malleable coatings, hydrophobic layers, medical implants, biocidal or biocompatible coatings, controlled released drug systems, non-volatile memories, solvent and/or gas barrier layers, air treatment systems, antireflective coatings and/or electromagnetic shielding and anti-icing systems in the fields of aeronautics, aerospace and/or embedded systems, etc. . . . ). Indeed, nanoparticles, i.e. particles with at least one dimension less than 1 μm, are developing unique physical and/or chemical properties. Embedded into an organic (e.g. polymer or amorphous carbon) or an inorganic (e.g. ceramic) matrix material, they are forming so-called nanocomposite or nanohybrid materials that exhibit multi-functional properties, the concentration, size, shape and distribution of nanoparticles together with the characteristics of the matrix contributing to the overall properties.

A recent definition restricts nanoparticles dimensions to about 10-20 nm. Indeed, the properties of nanocomposite materials are not only the sum of the individual contributions of both phases but also of interfaces, the role of the inner interfaces being really important for smaller nanoparticles. As an example, 1 $cm^3$ of a nanocomposite material filled with 10 vol % isotropic nanoparticles having a radius of 100 nm corresponds to a nanocomposite material having a concentration of $2.4 \times 10^{13}$ nanoparticles embedded in a matrix, and thus having a surface area of $7.5 \times 10^{-1}$ $m^2$. Reducing the radius of the nanoparticles to 10 nm leads to a nanocomposite material having a nanoparticles' density 3 decades (i.e. $10^3$ times) more important and a surface area 10 times larger. Hence, it is expected that the latter nanocomposite material would develop higher properties than the first one.

In addition, some of the unique properties of nanocomposite materials require not only the nanoparticles to be nanosized, but also the nanoparticles to be dispersed homogeneously without agglomeration.

As an example, ZnO nanoparticles have found widespread interest during past few years due to their unique electro-optical properties, which can be employed in devices such as ultraviolet (UV) light-emitting diodes (LEDs), blue luminescent devices or UV lasers. To obtain ZnO or other metal oxide nanoparticles with fine particle size, many synthesis methods have been used including chemical precipitation, sol-gel synthesis, solvothermal/hydrothermal method, microemulsion or organometallic synthesis. However, the size and hence the properties of such nanoparticles are adjusted and/or controlled depending on their preparation method. In particular, FR2853307 described the preparation of zinc oxide nanoparticles in the form of nanospheres having an average size of 9 nm by mixing an equimolar amount of an organometallic zinc precursor [$Zn(C_6H_{11})_2$] and a dodecylamine ligand (DDA) (0.042 $mol \cdot l^{-1}$) in tetrahydrofuran (THF) in a Schlenck-type reactor under a controlled argon atmosphere; by leaving the resulting solution in the absence of light for 17 hours without stirring; by opening the reactor and by bringing into contact the resulting mixture with ambient air and humidity.

However, although nanoparticles increase the strengths of many materials and devices, they can have real impacts on the human health and on the environment compared to bulk particles. Indeed, nanoparticles can easily be attached to bio-uptake, contaminants or organic compounds and transported to a more sensitive environment such as aqueous environments. Possible aggregation can also allow for conventional transportation to sensitive environments where the nanoparticles can break up into smaller colloidal nanoparticles. Depending on their solubility in water, they can also be transported by water, preventing them from being separated from waste. Finally, they can be easily transported by sorption-desorption mechanisms or deposition. Therefore, a principle of precaution suggests that handling of nanoparticles should be limited. However, most of the prior art method syntheses require nanoparticles collection and handling and large-scale application is not conceivable.

In addition, the implementation of REACH regulation, which is a European regulation adopted to improve the protection of human health and of the environment from the risks that can be caused by chemicals, could limit the development of nanomaterials in the near future since most of the conventional preparation methods, more particularly industrial scale preparation methods, are not optimized to avoid handling of said nanoparticles. Indeed, the conventional methods used for nanocomposite materials formation require a step of incorporation/dispersion of as-prepared nanoparticles in an organic or inorganic matrix material, involving nanoparticles handling. As an example, Li et al. [e.g. Li et al., *Polymer*, 2006, 47, 2127-2132] described the preparation of a ZnO/epoxy nanocomposite material by firstly synthesizing ZnO nanoparticles with an average particle size of 26.7 nm including a precipitation step of a ZnO precursor and a calcination step; and secondly by forming the nanocomposite material including a dispersion step of the as-prepared ZnO nanoparticles in an epoxy resin and a curing agent and a heating step of the resulting mixture into a stainless steel mould. The nanocomposite material obtained contained 0.07 wt % of ZnO nanoparticles.

Some preparation methods of nanocomposite materials involve the in situ synthesis of nanoparticles or concurrently with the host matrix in the process chamber. For example, plasma-enhanced chemical vapor deposition PE-CVD and/or various sputter deposition techniques allow forming nanoparticles simultaneously with the matrix deposition [e.g. Mungkalasiri et al., *Surf. Coat. Technol.*, 2009, 204, 887-892]. Although appealing, these methods are limited on the type and complexity of nanoparticles that can be incorporated, imposed by the deposition conditions which must coincide, often leaving a narrow operational window. Moreover, such methods are not optimized to control the quality of the synthesized nanoparticles, especially their range of size and distribution, the uniformity or regularity of their shape, and/or their homogeneous dispersion in the host matrix.

In parallel, aerosol assisted chemical vapor deposition (CVD) based on preformed nanoparticle solutions has been developed [e.g. Vervaele et al., *Review of Scientific Instruments*, 2016, 87, 025101]. Direct Liquid Injection (DLI) devices as described in FR2900070, are used for injecting or spraying the liquid mixture with a carrier gas. However, aggregation of nanoparticles is reported on several conditions and nanoparticle handling is needed.

Figure 1:
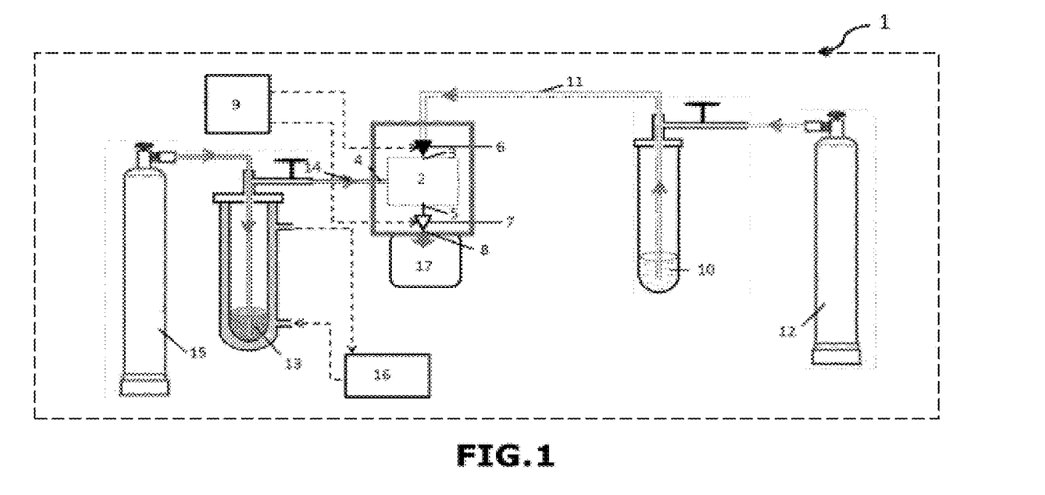
FIG. 1 represents an example of a device implemented in the method of the present invention.

The Direct Liquid Injection (DLI) device comprises at least one mixing chamber which includes at least one first inlet for admission of said liquid compound or said solution in said mixing chamber, at least one second inlet for admission of the carrier gas, an outlet for expulsion of a mixture of carrier gas and droplets of said liquid compound or said solution, a liquid injector arranged upstream of the first inlet so as to inject or spray said liquid compound or said solution into said mixing chamber, and a mixture injector arranged downstream of the outlet so as to inject or spray said mixture through a single outlet of said mixture injector. The device also comprises control means for controlling the injection or the spray of said liquid compound or said solution and/or said mixture (FIG. 1 of FR2900070). The DLI device is usually connected to an evaporation chamber to convert the mixture of carrier gas and droplets of said liquid compound or said solution into vapors. Said evaporation chamber can be connected to any process chamber which uses vapors of a compound, for example to implement chemical vapor deposition (CVD), atomic layer deposition (ALD), molecular vapor deposition (MVD), etc. . . .

However, this DLI device is generally not implemented with solid compounds such as nanoparticles. Indeed, any solid compound is previously dissolved in a solvent or possibly dispersed in a solvent so as to form a suspension of very small non agglomerated nanoparticles (e.g. average diameter of about 3 to 5 nm) in said solvent, the concentration of said nanoparticles in the suspension been very low (e.g. $<10^{-2}$-$10^{-3}$ mol·l$^{-1}$). It thus prevents the liquid and mixture injectors to become obstructed during use, which can cause, for constant control parameters of the injectors, a regular reduction in the flow injected and then the breakdown of the device. Furthermore, when the nanoparticles are previously dispersed in a solvent, this implies the manipulation of nanoparticles before injection, potentially inducing environmental and safety risks.

In addition, the DLI device has never been used to carry out a chemical reaction between two reactants so as to form a product. The carrier gas is an inert gas and therefore does not react with the liquid compound or the solution in the mixing chamber. Indeed, the carrier gas causes a dispersing blast effect on the liquid compound or the solution and makes it possible to obtain very fine liquid droplets and therefore improve the atomization of the droplets.

Objects and Summary:

Thus, the aim of the present invention is to overcome the drawbacks of the prior art and to provide a preparation method of nanoparticles which is simple, economic and environmentally friendly, while guaranteeing a good control of the size, the morphology and the dispersion (isolated nanoparticles, i.e. not aggregated) of said nanoparticles.

A first object of the present invention is a method for the preparation of nanoparticles selected from the group consisting of metal nanoparticles, metal oxide nanoparticles and semiconductor nanoparticles, wherein said method is implemented in a device comprising:
  at least one reacting chamber including at least one first inlet for admission of said liquid phase in said reacting chamber, at least one second inlet for admission of said gas phase in said reacting chamber, and an outlet for expulsion of said nanoparticles from said reacting chamber,
  a liquid injector arranged upstream of the first inlet for injecting or spraying said liquid phase into said reacting chamber,
  an injector of nanoparticles arranged downstream of the outlet for injecting or spraying said nanoparticles through an outlet of said nanoparticles injector, and
  control means for controlling the injection or the spray of said liquid phase and/or said nanoparticles, and wherein said method comprises:
  a step 1) of injecting a liquid phase comprising at least one nanoparticles precursor selected from the group consisting of precursors of metals, precursors of metal oxides and precursors of semiconductors in said reacting chamber through said liquid injector,
  a step 2) of contacting said liquid phase with a gas phase comprising at least one carrier gas and at least one reacting gas, said step 2) being carried out in said reacting chamber,
  a step 3) of reacting the nanoparticles precursor with the reacting gas so as to form nanoparticles, and
  a step 4) of expulsion of the nanoparticles produced in step 3) from the reacting chamber through the nanoparticles injector, said nanoparticles being under the form of an aerosol at the outlet of the nanoparticles injector.

Thanks to the method of the present invention, nanoparticles are produced in situ, thus avoiding their handling during their preparation. Indeed, nanoparticles are formed in the injection device thanks to the reaction between said nanoparticles precursor as a first reactant and said reacting gas as a second reactant which are contacted in the reacting chamber during step 2). Thus, the device acts as a reactor-injector. Furthermore, the formed nanoparticles can directly be inserted in a matrix at the outlet of the device, thus preventing further handling.

The method of the invention is simple, economic and environmentally friendly. In addition, it allows a good control and monitoring of the size and the morphology of said nanoparticles. Moreover, the method is robust, reproducible and can be easily scaled-up. In addition, it is versatile. Therefore, it can be implemented with a large number of chemical reactions which are already known to afford nanoparticles quantitatively.

Within the meaning of the present invention, the term "nanoparticles" is understood to mean particles having at least one dimension smaller than about 100 nm, particularly having a size ranging from about 1 to about 100 nm, more particularly from about 1 to about 50 nm, and more particularly from about 1 to about 10 nm.

Nanoparticles are preferably in the form of nanocrystals. Within the meaning of the present invention, the term "nanocrystal" is understood to mean a nanoparticle (as defined above) composed of atoms in either a single- or poly-crystalline arrangement.

The nanoparticles that are formed according to the method of the present invention are advantageously non agglomerated nanoparticles.

At the outlet of the nanoparticles injector, the nanoparticles are under the form of an aerosol. An aerosol has to be understood as nanoparticles in suspension in a gas phase (in the case of the optimal conditions) or as a mixture of nanoparticles and liquid droplets in a gas phase (in case of less optimal conditions).

Among metal nanoparticles, nanoparticles of Zn, Cu, Ag, Ru, Pt, Pd, Au, Ir, Sn, Fe, Co, Ni or alloys of any of the aforementioned metals are preferred.

Among metal oxide nanoparticles, nanoparticles of zinc oxide, tin oxide, cadmium oxide, boron oxide, aluminum oxide, gallium oxide, indium oxide, thallium oxide, germanium oxide, titanium oxide, zirconium oxide, hafnium oxide, lanthanide oxides (e.g. Ce, Pr, Nd, Sm, Eu, Gd, Tb, Dy, Ho, Er, Tm, Yb, Lu), scandium oxide, yttrium oxide, silicon oxide or bismuth oxide are preferred.

Among semiconductor nanoparticles, mixed semiconductor nanoparticles comprising at least one element from column 12 and at least one element from column 16 of the table of the periodic system of the chemical elements and mixed semiconductor nanoparticles comprising at least one element from column 13 and at least one element from column 15 of the table of the periodic system of the chemical elements are preferred.

Examples of mixed semiconductor nanoparticles comprising at least one element from column 12 and at least one element from column 16 of the table of the periodic system of the chemical elements are CdSe, ZnS, CdS, or ZnO.

Examples of mixed semiconductor nanoparticles comprising at least one element from column 13 and at least one element from column 15 of the table of the periodic system of the chemical elements are GaAs, GaP, InP, InAs or GaN.

The nanoparticles precursor used in step 1) can be either liquid at ambient temperature (e.g. 20-25° C. approximately) or can be dissolved in a solvent so as to form a liquid phase at ambient temperature.

The solvent can be any solvent which dissolves the nanoparticles precursor, and possibly the other compounds which are susceptible to be present in the liquid phase (e.g. compounds used to form a matrix material).

Within the meaning of the present invention, the term "nanoparticles precursor" is understood to mean a reactant containing at least one chemical element which will constitute the nanoparticles.

The reacting gas is able to react with the nanoparticles precursor so as to produce the nanoparticles.

The reacting gas can be selected from the group consisting of reductive gases and oxidative gases.

More particularly, the reacting gas can be water vapor, dioxygen, dihydrogen, carbon dioxide or carbon monoxide.

In one embodiment, the reacting gas is tuned to drive the transformation of the nanoparticles precursor into the nanoparticles [step 3)] upon contact of said reacting gas with the liquid phase in the reacting chamber [step 2)].

In this embodiment, the reacting gas is not a nanoparticles precursor. In other words, it does not contain a chemical element which is present in the targeted nanoparticles.

In another embodiment, the reacting gas is a nanoparticles precursor. Therefore, the reacting gas contains at least one chemical element which will constitute the targeted nanoparticles.

This embodiment is particularly appropriate if nanoparticles of mixed metals, mixed metal oxides or mixed semiconductors are prepared. The transformation of both the nanoparticles precursor and the reacting gas into the nanoparticles occurs (step 3)) upon contact of said reacting gas with the liquid phase in the reacting chamber (step 2)).

The liquid phase can further comprise at least one stabilizing agent.

The stabilizing agent (also called stabilizing ligand or passivating agent) aims at stabilizing nanoparticles. It usually stabilizes the surface of the nanoparticles and generally represents an organic molecule which binds to the surface of the nanoparticles and thus avoids aggregation and/or agglomeration and/or coalescence of said nanoparticles. The stabilizing agent ensures the isolation of the nanoparticles during the process of their formation (in the reacting chamber) while preventing their agglomeration.

Any stabilizing agent known by the person skilled in the art which is either liquid at ambient temperature or dissolved in the liquid phase and which interacts with the nanoparticles (or at least with the nanoparticles precursor) by physisorption or chemisorption can be used in the method of the present invention.

Advantageously, the stabilizing agent can be selected from the group consisting of amines (e.g. primary amines), acids (e.g. carboxylic acids), thiols, phosphorus derivatives and ethers bases.

Amines, preferably saturated aliphatic amines, and more preferably saturated aliphatic amines having from 6 to 20 carbon atoms can be used.

The liquid phase can further comprise at least one second nanoparticles precursor (which is different from the first nanoparticles precursor described above). Such second nanoparticles precursor is generally able to react with the reacting gas (like the first nanoparticles precursor) so as to form the nanoparticles.

A second nanoparticles precursor is usually used if nanoparticles of mixed metals, mixed metal oxides or mixed semiconductors are prepared.

The method of the present invention is versatile and, depending on the nature of the reacting gas and the nanoparticles precursor(s), several types of reactions can be conducted.

Step 3) can be selected from chemical reactions involving hydrolysis, oxidation, reduction and acid-base reaction.

Examples of such chemical reactions can be:
reactions of coordination complexes (i.e. organometallic or inorganic compounds) with water, dioxygen ($O_2$) or dihydrogen ($H_2$),
reactions of compounds comprising at least one element from column 13 of the table of the periodic system of the chemical elements with a hydride gas comprising at least one element from column 15 of the table of the periodic system of the chemical elements,
reactions of silicon precursors with ozone, or water, or dioxygen ($O_2$)
reactions of cobalt precursors with dioxygen, or water.

Examples of chemical reactions involving the reaction of an organometallic compound with water are described in FR2853307.

Examples of chemical reactions involving the reaction of a compound comprising at least one element from column 13 of the table of the periodic system of the chemical elements with a hydride gas comprising at least one element from column 15 of the table of the periodic system of the chemical elements are described in FR2969137.

The device implementing the method of the present invention can further comprise a tank $T^1$ for containing the liquid phase as defined in the present invention.

This tank $T^1$ can be connected by a conduit or a supply line to the first inlet of the reacting chamber.

In one embodiment, the method of the invention comprises prior to step 1), a step i) of preparing a liquid phase as defined in the present invention in a tank $T^1$ as defined in the present invention.

The tank $T^1$ can be a Fisher Porter Tube.

The tank $T^1$ must be connected to a tank $T^2$ of pressurized gas, also called a driving gas, so as to enable the introduction of the pressurized gas through the upper portion of the tank $T^1$. The pressurized gas enables a specific pressure to be maintained in the tank $T^1$ and, more specifically, a pressure higher than the pressure of the reacting chamber.

The driving gas of tank $T^2$ can be argon, helium or nitrogen.

Pressurization means can be used to allow for a very precise control of the liquid phase driving pressure.

Advantageously, the pressure ($P^2$) in the tank $T^2$ is at least 1.5 bar above the atmospheric pressure (i.e. 2.5 bar), and more preferably ranges from about 1.5 bar above the atmospheric pressure to about 5 bar above the atmospheric pressure.

The device can further comprise a tank $T^3$ for containing a gas phase as defined in the present invention and possibly a reacting liquid.

The reacting liquid is able to directly produce a reacting gas as defined in the present invention under appropriate temperature and pressure conditions.

This tank $T^3$ can be connected by a conduit or a supply line to the second inlet of the reacting chamber.

The tank $T^3$ can be a Fisher Porter Tube.

The tank $T^3$ can be connected to a tank $T^4$ for containing the carrier gas.

The carrier gas can be argon, helium or nitrogen.

In one embodiment, the method of the invention comprises prior to step 2), a step i') of preparing a gas phase as defined in the present invention in a tank $T^3$ as defined in the present invention.

During step i'), the carrier gas of the tank $T^4$ can be introduced into a tank $T^3$ as defined in the present invention containing the reacting gas and possibly the reacting liquid.

The introduction of the carrier gas of tank $T^4$ into the tank $T^3$ can be performed by any type of means. More specifically, the carrier gas is introduced continuously into the tank $T^3$. A pressure regulator can be arranged between the tank $T^4$ and the tank $T^3$.

Advantageously, the pressure in the tank $T^4$ is at least equal to a pressure $P^4$=Pressure in the tank $T^2$ (i.e. $P^2$)−0.5=$P^2$−0.5 bar, and more preferably ranges from about 1 bar to about 4.5 bar above the atmospheric pressure.

In one embodiment, the reacting liquid is present in the tank $T^3$.

The reacting liquid can be water liquid. Thus, the reacting gas produced from the reacting liquid is water gas (water vapors).

Thus, the pressure of the pressure regulator arranged between the tank $T^4$ and the tank $T^3$ during the introduction of the carrier gas into the tank $T^3$ (i.e. during step i')) can be controlled so as to involve bubbling of the reacting liquid and conversion of said reacting liquid into the reacting gas.

Thus, during step i'), the reacting gas is produced in situ in the tank $T^3$ from the reacting liquid and the carrier gas of tank $T^4$ is introduced into the tank $T^3$, so as to form the gas phase.

In addition, the device can further comprise a heating circulator surrounding the tank $T^3$ for controlling the temperature of the reacting liquid into the tank $T^3$ and involving conversion of said reacting liquid into the reacting gas during step i').

The heating circulator can heat the reacting liquid to a temperature ranging from about 30° C. to about 70° C.

In another embodiment, no conversion of a reacting liquid into a reacting gas is required. Thus, the reacting liquid is not present in the tank $T^3$.

In this embodiment, the tank $T^3$ can be connected to a tank $T^5$ for containing a reacting gas as defined in the present invention.

The reacting gas can be hydrogen, oxygen, ammoniac or arsine.

Thus, during step i'), the reacting gas of tank $T^5$ and the carrier gas of tank $T^4$ are both introduced into the tank $T^3$, so as to form the gas phase.

The introduction of the reacting gas of tank $T^5$ into the tank $T^3$ can be performed by any type of means. More specifically, the reacting gas is introduced continuously into the tank $T^3$. A pressure regulator can be arranged between the tank $T^5$ and the tank $T^3$.

The method can further comprise prior to step 2) [and after step i') if step i') exists], a step ii') of introducing a gas phase as defined in the present invention in a reacting chamber as defined in the present invention through the second inlet.

During step 3), the pressure P in the reacting chamber is generally at most equal to the pressure in the tank $T^2$ ($P^2$).

The pressure P in the reacting chamber is generally at least equal to the pressure in a process chamber which is connected to the outlet of the nanoparticles injector of the device as defined in the present invention.

Control means of the device provides control signals A0 and Aa respectively intended to control the opening and closing of the liquid and nanoparticles injectors. The control signals are preferably binary logic control signals.

The control means (e.g. injection control unit) can control the flow rate (or pulsed) of the liquid injector and/or of the nanoparticles injector.

The flow rate (or pulsed) can be defined by the following injection parameters: a frequency injection (in Hz) and/or an opening duration (in ms).

In one particular embodiment, the duration of the opening and/or the frequency of the injection of the liquid injector arranged upstream of the first inlet of the reacting chamber for injecting or spraying said liquid phase into said reacting chamber can be controlled so that the entire amount of liquid phase is introduced into the reacting chamber.

Advantageously, during step 1) the duration of the opening of the liquid injector ranges from about 1 ms to about 20 ms, and preferably from about 1 ms to about 10 ms.

During step 1), the frequency of the injection of the liquid injector can range from about 1 Hz to about 50 Hz, and preferably from about 1 Hz to about 5 Hz.

In step 4), nanoparticles possibly dispersed in mixture with a gaseous or liquid phase are expulsed.

When a process chamber is connected to the outlet of the nanoparticles injector of the device as defined in the present invention, nanoparticles possibly dispersed in mixture with a gaseous or liquid phase are expulsed from the reacting chamber to said process chamber during said step 4).

In one particular embodiment, the duration of the opening and/or the frequency of the injection of the nanoparticles injector arranged downstream of the outlet of the reacting chamber for injecting or spraying the nanoparticles through an outlet of said nanoparticles injector can be controlled so that the step 3) is complete (i.e. the nanoparticles precursor(s) has been totally consumed so as to form the nanoparticles).

Step 2) and step 3) can be simultaneous.

Advantageously, during step 4) the duration of the opening of the nanoparticles injector ranges from about 1 ms to about 20 ms, and preferably from about 1 ms to about 10 ms.

In one preferred embodiment, the ratio of the duration of opening of the nanoparticles injector/the duration of opening of the liquid injector is superior or equal to 2, preferably to 4, and preferably to 5, when the pressure at the outlet of the nanoparticles injector of the device as defined in the present invention or in a process chamber connected to the outlet of the nanoparticles injector of the device as defined in the present invention is equal to the atmospheric pressure.

In another preferred embodiment, the ratio of the duration of opening of the nanoparticles injector/the duration of opening of the liquid injector is superior or equal to 1, when the pressure at the outlet of the nanoparticles injector of the device as defined in the present invention or in a process chamber connected to the outlet of the nanoparticles injector of the device as defined in the present invention is below the atmospheric pressure.

During step 4), the frequency of the injection of the nanoparticles injector can range from about 1 Hz to about 50 Hz, and preferably from about 1 Hz to about 5 Hz.

Preferably, the device implemented in the method of the present invention does not comprise an evaporation chamber.

The device implemented in the method of the present invention can be any conventional Direct Liquid Injection devices such as the ones commercialized by Kemstream under the brand name ATOKIT KF50 Direct Liquid Injection atomizer.

Step 3) is preferably a chemical reaction involving the reaction of an organometallic compound with water. Thus, the nanoparticles precursor is an organometallic compound and the reacting gas is water vapors. This reaction leads to metal oxide nanoparticles.

The organometallic compound can be any molecule or coordination compound containing at least one organic group bonded to at least one metal atom (transition metal or main group element) by a carbon atom or a hetero atom, excluding oxygen (selected especially from N, P, As, Si, S, Se, Te), of that organic group.

The organometallic compound is spontaneously reactive to hydrolysis and is converted exothermically into a metal oxide when it is brought into contact with the water vapors as the reacting gas.

The metal atom of the organometallic compound can be selected from the group consisting of zinc, tin, cadmium, boron, aluminum, gallium, indium, thallium, germanium, titanium, zirconium, hafnium, lanthanides (e.g. Ce, Pr, Nd, Sm, Eu, Gd, Tb, Dy, Ho, Er, Tm, Yb, Lu), scandium, yttrium, silicon or bismuth.

By way of examples of organometallic compounds which can be used in a method according to the invention there may be mentioned complex coordination compounds comprising at least one of the above-mentioned metals and at least one group selected from amides, alkyls, aryls, cyclopentadienyls, olefins, polyolefins, alkynes and silyls.

Examples of suitable organometallic compounds are $Zn(C_6H_{11})_2$, commonly designated $ZnCy_2$, $[Sn(N(CH_3)_2)_2]_2$, tin dicyclopentadienyl $Sn(C_5H_5)_2$, indium cyclopentadienyl $In(C_5H_5)$, $\{Fe[N(SiMe_3)_2]_2\}$, $\{Co[N(SiMe_3)_2]_2\}$, $[Ni(COD)_2]$, $Ru(COD)(COT)$ or $[Cu(iPr-Me-AMD)]_2$.

The liquid phase which is injected in the reacting chamber thus comprises said organometallic compound as a nanoparticles precursor.

The liquid phase can further comprise a non-aqueous solvent so as to dissolve the organometallic compound at ambient temperature (e.g. 20-25° C. approximately), more particularly when the organometallic compound used in step 1) is solid at ambient temperature.

Such non-aqueous solvent can be selected from alkanes (e.g. pentane, heptane or cyclohexane) or toluene.

When the organometallic compound used in step 2) is liquid at ambient temperature, a solvent is not required. Such organometallic compound can be hexamethyldisiloxane.

In one embodiment, the molar concentration of the organometallic compound in the liquid phase ranges from about 0.001 mol/l to about 1 mol/l, and preferably from about 0.01 mol/l to 0.1 mol/l.

The liquid phase can further comprise a stabilizing agent as defined in the present invention.

The stabilizing agent is preferably a saturated aliphatic amine, more preferably having from 6 to 20 carbon atoms such as hexadecylamine, dodecylamine or octylamine.

The molar ratio of stabilizing agent/organometallic compound can range from about 0.01 to about 5, and preferably from about 0.1 to about 2.

After step 4), the method can further comprise a step 5) of recovering the nanoparticles.

This step 5) can be achieved by directly connecting a container such as a Schlenk flask, to the outlet of said nanoparticles injector.

A second object of the present invention is a method for the preparation of a nanocomposite material comprising nanoparticles and at least one matrix material, wherein the method comprises at least the following steps:

A) a step of preparing nanoparticles according to the method as defined in the first object of the present invention, B) a step of dispersing said nanoparticles in a matrix material or a precursor of a matrix material, and C) a step of producing the nanocomposite material, and wherein step B) is carried out either in the reacting chamber of the device as defined in the present invention or in a process chamber which is connected to the outlet of the nanoparticles injector of the device as defined in the present invention.

Thus, the method of the present invention allows a "safety-by-design" preparation of a wide range of nanocomposite materials without any manipulation of nanoparticles, and therefore with a high degree of safety (for manufacturers and users) and reduced environmental impact while guaranteeing a good control of the dispersion of the nanoparticles in the matrix material.

In the nanocomposite material, the nanoparticles are preferably non agglomerated nanoparticles.

The matrix material can be an organic or inorganic matrix material.

Examples of organic matrix materials are organic polymer matrices.

Examples of inorganic matrix materials are ceramic matrices or inorganic polymer matrices.

Step B) is preferably a mixing step or a chemical vapor deposition step (CVD).

The CVD step is generally used to prepare a matrix material (from a precursor of said matrix material) in the form of a thin layer or in the form of nano-objects such as carbon nanotubes.

In a first variant, step B) is carried out in the reacting chamber of the device as defined in the present invention.

In this first variant, the liquid phase as defined in the present invention (which already contains said nanoparticles precursor) can further comprise the matrix material or the precursor of the matrix material, provided that the matrix material or the precursor of the matrix material is inert towards the nanoparticles precursor and is dissolved in the liquid phase, more particularly during step 1).

In another embodiment of this first variant, the matrix material or the precursor of the matrix material can be contained in another liquid phase or can constitute another liquid phase. In this embodiment, the reacting chamber can include at least one third inlet for admission of said another liquid phase in said reacting chamber.

In the first variant, the precursor of the matrix material can be any monomer which is able to polymerize in the presence of the nanoparticles during step C) so as to form a nanocomposite material comprising nanoparticles and an inorganic or organic polymer as the matrix material or any precursor which is able to condense in the presence of the nanoparticles during step C) so as to form a nanocomposite material comprising nanoparticles and an inorganic or organic matrix material.

Examples of such precursors are hexamethyldisiloxane (HMDSO) or tetraethoxysilane (TEOS). Those precursors are able to condense into thin films under dry processes such as plasma or thermal CVD.

The precursor of the matrix material can also be the solvent which is used to dissolve the nanoparticles precursor in the liquid phase, more particularly during step 1).

Examples of such solvents are alkanes (e.g. pentane, heptane or cyclohexane) or toluene. Those solvents are able to react under plasma-polymerization conditions.

The matrix material can be any inorganic or organic polymer.

In a second variant, step B) is carried out in a process chamber which is connected to the outlet of the nanoparticles injector of the device.

Thus, the process chamber can comprise a container for receiving the nanoparticles which includes said matrix material or said precursor of the matrix material and is directly connected to the outlet of the nanoparticles injector.

In this second variant, the precursor of the matrix material can be any monomer which is able to polymerize in the presence of the nanoparticles during step C) so as to form a nanocomposite material comprising nanoparticles and an inorganic or organic polymer as the matrix material or any precursor which is able to condense in the presence of the nanoparticles during step C) so as to form a nanocomposite material comprising nanoparticles and an inorganic or organic matrix material.

Examples of such monomers are (a) acrylates, methacrylates (e.g. methyl methacrylate (MMA)), (meth)acrylamides, styrene-based monomers including functionalized ones, acrylonitrile, vinyl acetate, N-vinylpyrrolidone, N-vinyl carbazole, vinyl chloride, vinyl cyclopropane or ketene acetals (which polymerize under radical polymerization), (b) lactones such as lactide or ε-caprolactone, cyclic carbonates such as trimethylenecarbonate, cyclic anhydrides, cyclosiloxanes, cyclic alkenes such as norbornenyl derivatives, cyclophosphazenes, oxazolines, cyclic ethers such as epoxides, cyclic amides or urethanes or cyclic phosphates (which polymerize by ionic polymerization), (c) polyacids, polyamines, phenol derivatives and aldehydes or polyepoxides (which polymerize by step growth polymerization).

The matrix material can be any inorganic or organic polymer.

Step C) can be any conventional step/process which involves the use of the nanoparticles prepared in situ according the method as defined in the first object of the invention.

Step C) is preferably chosen from a polymerization step (e.g. radical polymerization, ionic polymerization, step growth polymerization, plasma-polymerization, polymerization initiated by organometallic species), a deposition step (CVD, PE-CVD, etc. . . . ), a sol-gel process, any conventional plastic forming step (extrusion, molding, injection-molding or compression molding) and a mixture thereof.

The nanoparticles that are formed within the matrix material according to step C) are advantageously non agglomerated nanoparticles. More particularly, nanoparticles are spaced out with each other by a distance of at least the mean size of said nanoparticles, more particularly by a distance of at least two times the mean size of said nanoparticles, and more particularly by a distance of at least three times the mean size of said nanoparticles, more particularly if PE-CVD is used.

The nanocomposite material can comprise from about 5% by weight to about 15% by volume of nanoparticles.

A third object of the present invention is the use of a device comprising:
  at least one reacting chamber including at least one first inlet for admission of a liquid phase comprising at least one nanoparticles precursor selected from the group consisting of precursors of metals, precursors of metal oxides and precursors of semiconductors in said reacting chamber, at least one second inlet for admission of a gas phase comprising at least one carrier gas and at least one reacting gas in said reacting chamber, and an outlet for expulsion of nanoparticles selected from the group consisting of metal nanoparticles, metal oxide nanoparticles and semiconductor nanoparticles from said reacting chamber,
  at liquid injector arranged upstream of the first inlet for injecting or spraying said liquid phase into said reacting chamber,
  a nanoparticles injector arranged downstream of the outlet for injecting or spraying said nanoparticles through an outlet of said nanoparticles injector, and
  control means for controlling the injection or the spray of said liquid phase and/or said nanoparticles for the preparation of said nanoparticles or of a nanocomposite material.

DETAILED DESCRIPTION

Examples

The starting materials used in the examples which follow, are listed below:
organozinc precursor [$Zn(C_6H_{11})_2$], NanoMeps, stored in a MBraun glove box at −27° C.,
dodecylamine (DDA), Aldrich, purity 99.5%,
2,2'-Azobis(4-methoxy-2,4-dimethyl valeronitrile (V-70), Wako chemicals,
argon, Air Liquide, grade: Alphagaz 1.

Unless specified, these starting materials were used as received from the manufacturers, without additional purification.

Pentane, toluene and tetrahydrofuran (THF) were dried using an MBraun SPS column. Cyclohexane was dried over sodium, distilled under argon and degassed prior to use. Methyl methacrylate was distilled under argon and stored at −20° C. over activated molecular sieves. The residual water contents of the solvent were systematically measured by Karl Fischer coulometric titration by using Metrohm equipment. The preparation of [$Zn(C_6H_{11})_2$] and DDA solution (pentane, cyclohexane or THF) was carried out under an argon atmosphere by using a MBraun glove box.

Characterizations

Samples for TEM analysis were prepared by slow evaporation of droplets of colloidal pentane (or toluene or THF) solutions deposited on carbon-supported copper grids. The samples were dried overnight under vacuum ($1\times10^{-5}$ mbar) by using a BOC Edward turbomolecular pump. The TEM experiments were recorded on a JEOL JEM1011 electron microscope operating at 100 kV.

The nanoparticle size distribution histograms were determined by using magnified TEM images. The size-distribution of nanoparticles was determined by measuring a minimum of 200 particles for each sample. The mean diameter was evaluated by fitting of the histogram with Gaussian curve. The first value corresponds to the center of the peak whereas the second one corresponds to twice the standard deviation of the Gaussian distribution or approximately 0.849 the width of the peak at half-height.

All optical measurements were achieved at room temperature using quartz cells of optical pathway of 1 cm.

Absorbance spectra were recorded on a Perkin Elmer Lambda 35 spectrophotometer between 280-600 nm. Emission spectra were measured using a Horiba-Jobin Yvon FluoroMax-4 spectrofluorometer, equipped with three-slit double-grating excitation and emission monochromators. Measurement slit values on the Horiba-Jobin Yvon Fluoro-Max-4 spectrofluorometer was kept constant with emission/excitation slits set at 2.2/3.5 nm. The excitation wavelength was fixed at 340 nm and the emission spectra were recorded between 350-700 nm. An emission band-pass filter of 370 nm was used. Spectra were reference-corrected for both the excitation source light-intensity variation (lamp and grating) and the emission spectral response (detector and grating).

FIG. 1 represents an example of a device implemented in the method of the present invention.

The device 1 comprises:
a reacting chamber 2 including a first inlet 3 for admission of the liquid phase in the reacting chamber 2, a second inlet 4 for admission of the gas phase, and an outlet 5 for expulsion of nanoparticles,
a liquid injector 6 arranged upstream of the first inlet 3 for injecting or spraying said liquid phase into said reacting chamber 2,
a nanoparticles injector 7 arranged downstream of the outlet 5 for injecting or spraying said nanoparticles through an outlet 8 of said nanoparticles injector 7, and
control means 9 for controlling the injection or the spray of said liquid phase and/or said nanoparticles.

The device can comprise a tank 10 (tank $T^1$) for containing the liquid phase and connected, by a conduit or a supply line 11 to the first inlet 3 of the reacting chamber 2.

The tank 10 can be connected to a tank 12 (tank $T^2$) of argon (driving gas), so as to enable the introduction of the argon gas through the upper portion of the tank 10.

The device can further comprise a tank 13 (tank $T^3$) for containing the gas phase and the reacting liquid and connected by a conduit or a supply line 14 to the second inlet 4 of the reacting chamber 2.

The tank 13 can be connected to a tank 15 (tank $T^4$) for containing argon (carrier gas).

In addition, the device can further comprise a heating circulator 16 connected to the tank 13 for controlling the temperature of the reacting liquid (water) into the tank 13 and involving conversion of said reacting liquid into the reacting gas (water vapors).

The outlet 8 of the nanoparticles injector 7 can be connected to a process chamber 17.

The device used in the following examples is a Direct Liquid Injection device commercialized by Kemstream under the brand name ATOKIT KF50 Direct Liquid Injection atomizer.

Example 1: Preparation of ZnO Nanoparticles

In a glove box, a zinc precursor [$Zn(C_6H_{11})_2$] (88 mg, 0.38 mmole) and dodecylamine (DDA, 7 mg, 0.1 equiv., 0.038 mmole) were dissolved in 15 ml of pentane in a dry Fisher Porter tube 10 so as to form a liquid phase. The resulting liquid phase was injected in a reacting chamber 2 through a liquid injector 6 and with the help of a pressurized tank 12 of argon set at 1.5 bar above the atmospheric pressure (i.e. 2.5 bar). Particular attention was taken to avoid any contact of the reactants with the ambient air by purging all the connected lines with argon. The liquid injection was pulsed with frequency of injection set at 1 Hz and an opening time of 2 ms controlled by an Injector Control Unit 9. In parallel, water vapor (reacting gas) was introduced in the reacting chamber 2 through an inlet 4 by bubbling argon (carrier gas set at 1 bar) into a Fischer Porter Tube 13 containing 5 ml of water (reacting liquid). The temperature of the water was controlled by a heating circulator 16 that allows driving more or less water vapor in the reacting chamber 2. The temperature of the heating circulator was set at 40° C. The formation of ZnO nanoparticles occurred in the reaction chamber 2 by hydrolysis of the zinc organometallic precursor in contact with water vapor. The contact time between the water vapor and the zinc precursor could be monitored by the nanoparticles injector 7. The nanoparticles injector 7 was pulsed with a frequency of injection set at 1 Hz and an opening time of 10 ms controlled by the ICU 9. A colloidal solution of ZnO particles in pentane was collected at the outlet 8 of the nanoparticles injector 7 and directly injected in a schlenk flask under an argon stream which is connected to the nanoparticles injector 7 via an adapter. The pressure at the outlet 8 of the nanoparticles injector 7 was equal to the atmospheric pressure.

The ZnO nanoparticles concentration of the solution was about 0.025 mol·L$^{-1}$ (10$^9$ nanoparticules·ml$^{-1}$).

The $^1$H NMR spectrum in toluene-d8 of the sample obtained revealed the disappearance of the zinc precursor signals. No protons corresponding to cyclohexyl and/or cyclohexane could be detected. The protons corresponding to the methyl group of DDA could be seen at 0.96 ppm as well as the ones corresponding to the CH$_2$ groups of DDA at 1.32 ppm and the one corresponding to the α proton of DDA at 2.55 ppm. These peaks correspond to DDA coordinated to ZnO nanoparticles and are similar to the one obtained in solution (i.e. without the use of an injector-reactor) [Coppel et al., *Chem. Eur. J.* 2012, 18, 5384].

Figure 2:
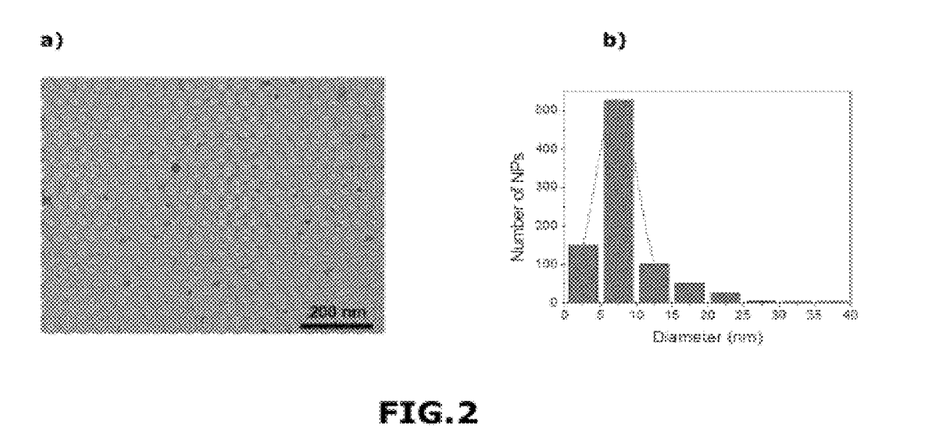
FIGS. 2a and 2b represent images of the ZnO nanoparticles by transmission electron microscopy and a related histogram from example 1, in accordance with one embodiment.

FIG. 2 represents an image of the ZnO nanoparticles by transmission electron microscopy (FIG. 2*a*) and the size distribution histogram of said nanoparticles (number of nanoparticles as a function of the diameter of nanoparticles, FIG. 2*b*).

Figure 3:
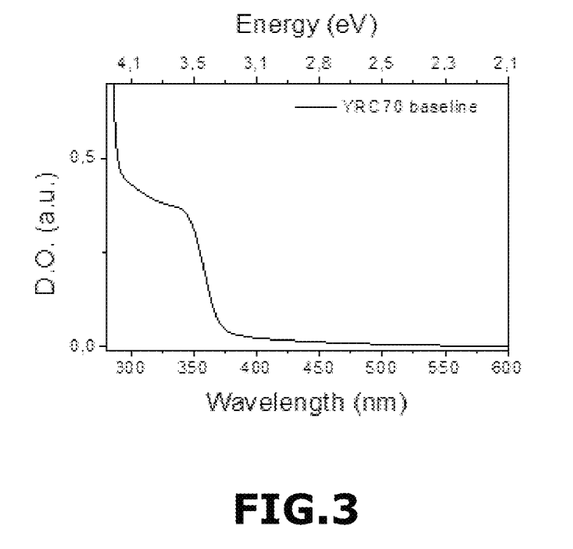
FIG. 3 represents the absorbance (UV-visible) spectrum of the ZnO nanoparticles in toluene (optical density in arbitrary units, in a.u., as a function of the wavelength in nanometers, in nm and as a function of the energy, in eV) of example 1 in accordance with one embodiment.

The mean size diameter of the ZnO nanoparticles was 7±6 nm (FIG. 3*b*).

FIG. 3 represents the absorbance (UV-visible) spectrum of the ZnO nanoparticles in toluene (optical density in arbitrary units, in a.u., as a function of the wavelength in nanometers, in nm and as a function of the energy, in eV). It shows an intense band-gap absorption at $\lambda_{1/2}$=360 nm [where $\lambda_{1/2}$ is the inflection point calculated by differentiation of the absorption spectrum or the wavelength at which the absorption is half of that at the excitonic peak or shoulder [Meulenkamp et al., *J. Phys. Chem. B*, 1998, 102, 5566, Zhang et al., *J. Phys. Chem. C*, 2010, 114, 9651]. This absorption is in agreement with nano-sized particles of ZnO displaying a band gap of ≈3.40 eV (365 nm).

Comparative Example 2: Preparation of ZnO Nanoparticles

In a glove box, a zinc precursor [Zn(C$_6$H$_{11}$)$_2$] (88 mg, 0.38 mmole) and dodecylamine (DDA, 7 mg, 0.1 equiv., 0.038 mmole) were dissolved in 15 ml of pentane in a dry Fisher Porter tube 10. The resulting liquid phase was injected in a reacting chamber 2 through a liquid injector 6 and with the help of a pressurized tank 12 of argon set at 1.5 bar above the atmospheric pressure (i.e. 2.5 bar). The liquid injection was pulsed with frequency of injection set at 1 Hz and an opening time of 10 ms controlled by an Injector Control Unit 9. In parallel, water vapor was introduced in the reacting chamber 2 through an inlet 4 by bubbling argon (carrier gas set at 1 bar) into a Fischer Porter Tube 13 containing 20 ml of water. The temperature of the water was controlled by a heating circulator 16 that allows driving more or less water vapor in the reacting chamber 2. The temperature of the heating circulator was set at 40° C. The nanoparticles injector 7 was pulsed with a frequency of injection set at 1 Hz and an opening time of 5 ms controlled by the ICU 9. A clear solution not comprising ZnO particles was collected at the end of the injection as described in example 1. The pressure at the outlet 8 of the nanoparticles injector 7 was equal to the atmospheric pressure.

Indeed, a yellow solution which contains an intermediate product and is free of ZnO nanoparticles was obtained. In particular, the $^1$H NMR spectrum in toluene-d8 revealed the partial disappearance of the signals corresponding to the zinc precursor. However, peaks of protons corresponding to cyclohexyl and cyclohexanol protons which are consistent with the formation of an intermediate product before the formation of ZnO nanoparticles could be detected. The protons corresponding to the methyl group of free DDA could be seen at 0.96 ppm as well as the protons corresponding to the CH$_2$ groups of free DDA at 1.32 ppm. As a conclusion, the opening times of the two injectors are not appropriate so as to form the ZnO nanoparticles (ratio of the duration of opening of the nanoparticles injector/the duration of opening of the liquid injector equal to 0.5). Indeed, not enough water vapor is introduced in the reacting chamber with respect to the amount of nanoparticles precursor.

Depending on the reaction involved in step 3), opening times of injectors may be adapted so that (a) the reaction occurs in the reacting chamber and (b) is complete.

Example 3: Preparation of a Nanocomposite Material Comprising ZnO Nanoparticles

In a glove box, a zinc precursor [Zn(C$_6$H$_{11}$)$_2$] (208.3 mg, 0.9 mmole) and dodecylamine (DDA, 17 mg, 0.1 equiv., 0.09 mmole) were dissolved in 18 ml of pentane in a dry Fisher Porter tube 10. The resulting liquid phase was injected in a reacting chamber 2 through a liquid injector 6 and with the help of a pressurized tank 12 of argon set at 1.5 bar above the atmospheric pressure (i.e. 2.5 bar). The liquid injection was pulsed with frequency of injection set at 3.5 Hz and an opening time of 5 ms controlled by an Injector Control Unit 9. In parallel, water vapor was introduced in the reacting chamber 2 through an inlet 4 by bubbling argon (carrier gas set at 1 bar) into a Fischer Porter Tube 13 containing 20 ml of water. The temperature of the water was controlled by a heating circulator 16 that allows driving more or less water vapor in the reacting chamber 2. The temperature of the heating circulator was set at 30° C. The nanoparticles injector 7 was pulsed with a frequency of injection set at 3.5 Hz and an opening time of 5 ms controlled by the ICU 9. A colloidal solution of ZnO particles in pentane obtained at the outlet 8 of the nanoparticles injector 7 was directly embedded in plasma polymer thin film (hydrocarbon thin film) by connecting a commercial «Ultima Centura» plasma reactor from Applied Materials (RF capacitively coupled plasma) as a process chamber to the outlet 8 of the nanoparticles injector 7. The RF power was fixed at 100 W. Nanocomposite thin films were deposited at ambient temperature at 0.36 mbar (pressure in the process chamber) on silicon wafer during ca. 13 min.

The film obtained was about 100 nm thick which is equivalent to a deposition rate of about 8 nm·min$^{-1}$. This deposition rate is in the same range of the classical RF plasma deposition processes.

Figure 4:
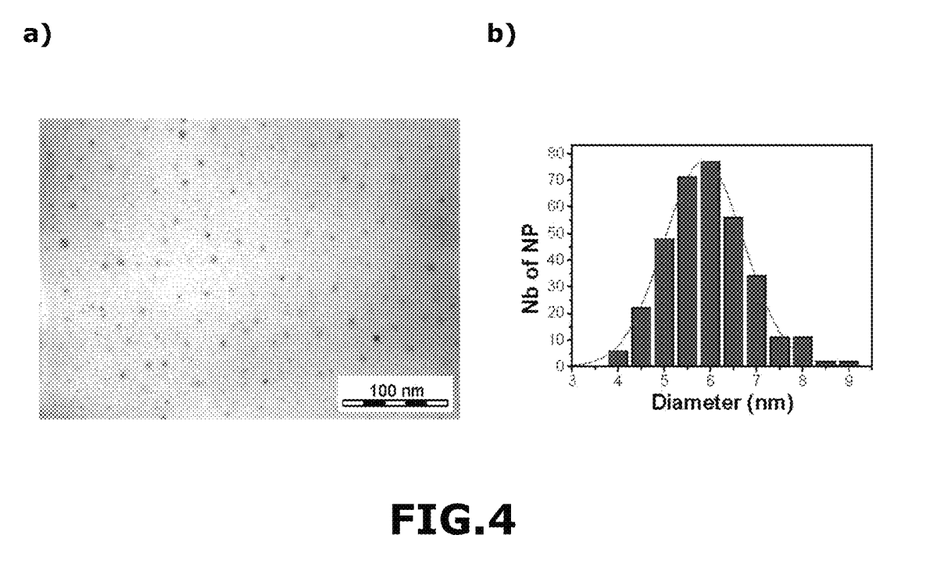
FIGS. 4a and 4b displays a TEM picture of the thin film comprising isotropic ZnO nanoparticles embedded in hydrogenated amorphous carbon matrix and a related histogram, from example 3, in accordance with one embodiment.

FIG. 4 displays a TEM picture of the thin film comprising isotropic ZnO nanoparticles embedded in hydrogenated amorphous carbon matrix (FIG. 4*a*). The nanoparticles average diameter was 5.9 nm (FIG. 4*b*) and their shape was similar to that obtained in example 1. It means that nanoparticles are sprayed from the DLI device and that they are not really modified in the plasma. The nanoparticles are spaced out with each other by a distance of 5 times the average diameter of said nanoparticles. It means that (1) nanoparticles are expulsed from the outlet 8 of the nanoparticles injector 7 in the form of a vapor, preventing their aggregation and that (2) they are not agglomerated in the plasma leading to a nanocomposite thin film with a really good dispersion. In addition, their residence time in the plasma volume was long enough to form a large continuum in the optical emission spectra of the plasma related to the fluorescence of ZnO nanoparticles.

FIG. 4a represents a nanocomposite film ZnO nanoparticles/hydrocarbon matrix in which the size of the ZnO nanoparticles is less than 10 nm. In addition, ZnO nanoparticles are non-aggregated and well dispersed in the hydrocarbon matrix.

The thin film contained $10^{11}$ particles/cm$^2$, which is equivalent to 2.5 vol % of isolated ZnO nanoparticles embedded in the film.

The IR spectrum of the obtained nanocomposite film showed in the range scanned the organic phase, i.e. the hydrocarbon matrix. Indeed, characteristic bands of C—C and C—H single bond vibrations were detected, which is in good agreement with amorphous carbon deposition. Note that C=O and O—H bond vibrations were also observed related to the presence of water in the plasma.

Comparative Example 4: Preparation of a Nanocomposite Material Comprising ZnO Nanoparticles In this example, the nanoparticles are not prepared according to the method of the present invention since they are prepared according to a conventional organometallic route which does not involve a device as defined in the present invention.

In a glove box, a zinc precursor [Zn(C$_6$H$_{11}$)$_2$] (208 mg, 0.9 mmole) and dodecylamine (DDA, 17 mg, 0.1 equiv., 0.09 mmole) were dissolved in 18 ml of THF. The resulting mixture was then stirred under argon and protected from light for 10 min. 0.41 ml of a THF solution containing 32 μL of H$_2$O (2 mmol) was then added dropwise under an argon stream. After 18 h, the stock solution was evaporated under vacuum and dissolved in 18 ml of pentane. However, most of the ZnO nanoparticles could not be properly dispersed in pentane and it was observed aggregation or agglomeration of nanoparticles. The ZnO nanoparticles concentration of the solution was about 2.43×10$^{-3}$ mol·l$^{-1}$ from UV-visible measurement which is ten times less than the concentration that can be obtained when using the method of the present invention.

It was not possible to determine the size of the nanoparticles since they are agglomerated.

The prepared ZnO nanoparticles dispersed in pentane were placed in a dry Fisher Porter tube 10 and the resulting mixture was injected in a reacting chamber 2 through a liquid injector 6 and with the help of a pressurized tank 12 of argon set at 1.5 bar above the atmospheric pressure (i.e. 2.5 bar). The liquid injection was pulsed with frequency of injection set at 3.5 Hz and an opening time of 5 ms controlled by an Injector Control Unit 9. The argon carrier gas for the reacting chamber 2 was set at 1 bar. The Fischer Porter Tube 13 did not contain water. Thus, no water vapor was introduced in the reacting chamber 2 and no reaction occurred in the reacting chamber 2. The nanoparticles injector 7 was pulsed with a frequency of injection set at 3.5 Hz and an opening time of 5 ms controlled by the ICU 9. A colloidal solution of ZnO particles in pentane obtained at the outlet 8 of the injector 7 was directly embedded in plasma polymer thin film (hydrocarbon thin film) by connecting a commercial «Ultima Centura» plasma reactor from Applied Materials (RF capacitively coupled plasma) as a process chamber to the outlet 8 of the nanoparticles injector 7. The RF power was fixed at 100 W. Nanocomposite thin films were deposited at ambient temperature at 0.36 mbar (pressure in the process chamber) on silicon wafer during ca. 13 min.

The film obtained was about 100 nm thick which is equivalent to a deposition rate of about 8 nm·min$^{-1}$. The nanoparticles average diameter of ZnO nanoparticles embedded in hydrogenated amorphous carbon matrix was 3.6 nm and their shape was similar to that obtained in example 1. However, the film contained less ZnO nanoparticles compared to the one of example 3 and some of the nanoparticles were agglomerated.

In this example, the size of the particles and the concentration of the solution are critical in order not to obstruct the outlet 5 and the nanoparticles injector 7. The solution was therefore diluted to implement this comparative example without obstruction problem. However, this preparation method is not suitable to obtain a nanocomposite of interest.

Example 5: Preparation of a Nanocomposite Material Comprising ZnO Nanoparticles

In a glove box, a zinc precursor [Zn(C$_6$H$_{11}$)$_2$] (160 mg, 0.69 mmole) and dodecylamine (DDA, 13 mg, 0.1 equiv., 0.069 mmole) were dissolved in 14 ml of toluene in a dry Fisher Porter tube 10. The resulting liquid phase was injected in a reacting chamber 2 through a liquid injector 6 and with the help of a pressurized tank 12 of argon set at 1.5 bar above the atmospheric pressure (i.e. 2.5 bar). The liquid injection was pulsed with frequency of injection set at 1 Hz and an opening time of 5 ms controlled by an Injector Control Unit 9. In parallel, water vapor was introduced in the reacting chamber 2 through an inlet 4 by bubbling argon (carrier gas set at 1 bar) into a Fischer Porter Tube 13 containing 5 ml of water. The temperature of the water was controlled by a heating circulator 16 that allows driving more or less water vapor in the reacting chamber 2. The temperature of the heating circulator 16 was set at 30° C. The nanoparticles injector 7 was pulsed with a frequency of injection set at 1 Hz and an opening time of 10 ms controlled by the ICU 9. A colloidal solution of ZnO particles in toluene was collected at the end of the injection as described in example 1 except that the Schlenk flask was filled with methyl methacrylate monomer (MMA, 3 ml, 28.2 mmole) and V-70 (119 mg, 0.39 mmole) which is an azo compound that is able to generate highly reactive radicals in the reaction medium and initiates free radical polymerization of MMA. The pressure at the outlet 8 of the nanoparticles injector 7 was equal to the atmospheric pressure. After the addition of the colloidal solution of ZnO nanoparticles in the MMA solution, the Schlenk flask was heated to 30° C. to initiate the free radical polymerization. The polymerization was left stirring under argon for ca. 18 h.

To provide a reference, the MMA monomer was submitted to a radical polymerization under the same conditions as described above but without adding the ZnO particles.

The inventors found that the presence of ZnO nanoparticles did not influence the rate of the free radical polymerization.

Figure 5:
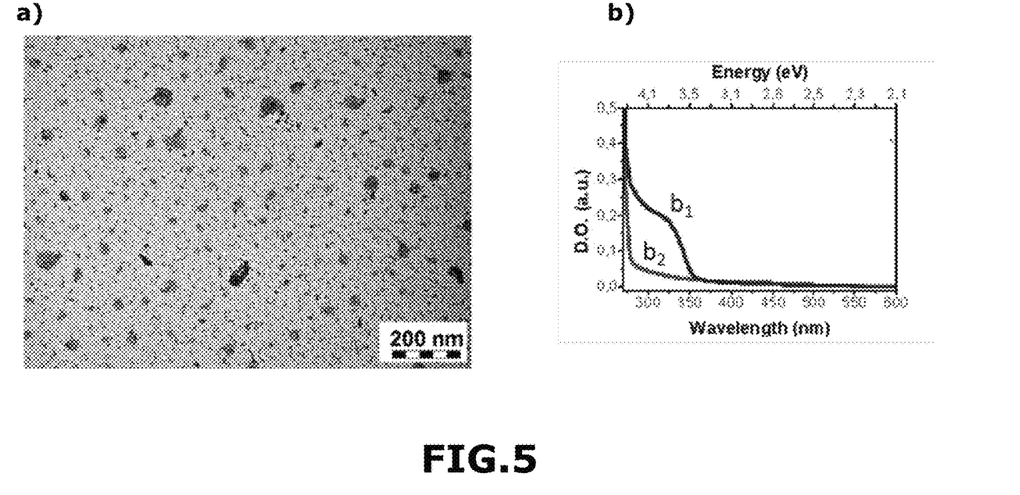
FIGS. 5a and 5b are a TEM picture of the PMMA-ZnO nanocomposite with ZnO nanoparticles embedded in PMMA matrix and related absorbance spectrum, from example 5, in accordance with one embodiment.

FIG. 5a displays a TEM picture of the PMMA-ZnO nanocomposite with ZnO nanoparticles embedded in PMMA matrix. The ZnO nanoparticles are non-aggregated and well dispersed in the polymer matrix.

FIG. 5b represents the absorbance (UV-visible) spectrum of the nanocomposite comprising the ZnO nanoparticles (curve $b_1$) and by comparison of the PMMA polymer not containing ZnO nanoparticles (curve $b_2$). FIG. 5b shows the optical density in arbitrary units, a.u., as a function of the wavelength in nanometers, nm and as a function of the energy, in eV. It revealed a strong absorption band between 300 and 350 nm followed by a sharp decrease, as shown in example 1, whereas the sample without ZnO nanoparticles did not reveal any absorption. The absorption observed for the nanocomposite is in agreement with nano-sized particles of ZnO.

The PMMA-ZnO nanocomposite contained 3% volume of ZnO nanoparticles. ZnO nanoparticles embedded in PMMA lead to a nanocomposite material having anti-reflection properties, flame-retardant properties and UV protecting properties.

Example 6: Preparation of Tin Oxide Nanoparticles

In a glove box, a tin precursor $[Sn(NMe_2)_2]_2$ (77.5 mg, 0.187 mmole) and dodecylamine (DDA, 3.5 mg, 0.1 equiv., 0.018 mmole) were dissolved in 15 ml of pentane in a dry Fisher Porter tube 10 so as to form a liquid phase. The resulting liquid phase was injected in a reacting chamber 2 through a liquid injector 6 and with the help of a pressurized tank 12 of argon set at 1.5 bar above the atmospheric pressure (i.e. 2.5 bar). Particular attention was taken to avoid any contact of the reactants with the ambient air by purging all the connected lines with argon. The pulsed liquid injection was controlled by an Injector Control Unit 9 with frequency of injection set at 1 Hz and an opening time of 5 ms. In parallel, water vapor (reacting gas) was introduced in the reacting chamber 2 through an inlet 4 by bubbling argon (carrier gas set at 1 bar) into a Fischer Porter Tube 13 containing 50 mL of water (reacting liquid). The temperature of the water was controlled by a heating circulator 16 that allows driving more or less water vapor in the reacting chamber 2. The temperature of the heating circulator was set at 60° C. The formation of tin oxide nanoparticles occurred in the reaction chamber 2 by hydrolysis of the tin organometallic precursor in contact with water vapor. The contact time between the water vapor and the tin precursor could be monitored by the nanoparticles injector 7. The pulsed of the nanoparticles injector 7 was controlled by the ICU 9 with a frequency of injection set at 1 Hz and an opening time of 10 ms. A colloidal solution of tin oxide particles in pentane was collected at the outlet 8 of the nanoparticles injector 7 and directly injected in a schlenk flask under an argon stream which is connected to the nanoparticles injector 7 via an adapter. The pressure at the outlet 8 of the nanoparticles injector 7 was equal to the atmospheric pressure.

Figure 6:
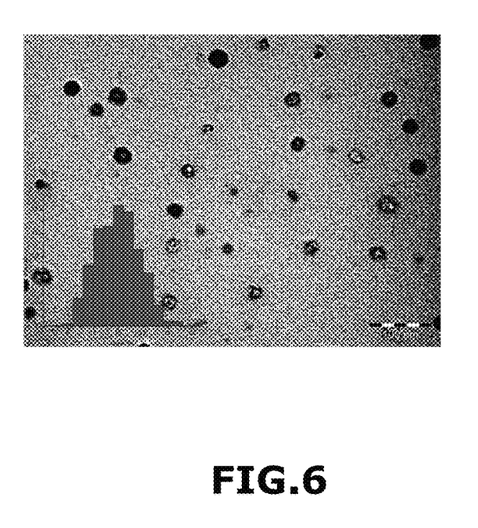
FIG. 6 is an image of the tin oxide nanoparticles by transmission electron microscopy from example 6, in accordance with one embodiment.

FIG. 6 represents an image of the tin oxide nanoparticles by transmission electron microscopy. The mean size diameter of the tin oxide nanoparticles was 14±9 nm.

Example 7: Preparation of Tin Oxide Nanoparticles

In a glove box, a tin precursor $[Sn(NMe_2)_2]_2$ (77.5 mg, 0.187 mmole) was dissolved in 15 ml of pentane in a dry Fisher Porter tube 10 so as to form a liquid phase. The resulting liquid phase was injected in a reacting chamber 2 through a liquid injector 6 and with the help of a pressurized tank 12 of argon set at 1.5 bar above the atmospheric pressure (i.e. 2.5 bar). Particular attention was taken to avoid any contact of the reactants with the ambient air by purging all the connected lines with argon. The pulsed liquid injection was controlled by an Injector Control Unit 9 with frequency of injection set at 1 Hz and an opening time of 5 ms. In parallel, water vapor (reacting gas) was introduced in the reacting chamber 2 through an inlet 4 by bubbling argon (carrier gas set at 1 bar) into a Fischer Porter Tube 13 containing 50 mL of water (reacting liquid). The temperature of the water was controlled by a heating circulator 16 that allows driving more or less water vapor in the reacting chamber 2. The temperature of the heating circulator was set at 60° C. The formation of tin oxide nanoparticles occurred in the reaction chamber 2 by hydrolysis of the tin organometallic precursor in contact with water vapor. The contact time between the water vapor and the tin precursor could be monitored by the nanoparticles injector 7. The pulsed of the nanoparticles injector 7 was controlled by the ICU 9 with a frequency of injection set at 1 Hz and an opening time of 10 ms. A colloidal solution of tin oxide particles in pentane was collected at the outlet 8 of the nanoparticles injector 7 and directly injected in a schlenk flask under an argon stream which is connected to the nanoparticles injector 7 via an adapter. The pressure at the outlet 8 of the nanoparticles injector 7 was equal to the atmospheric pressure.

Figure 7:
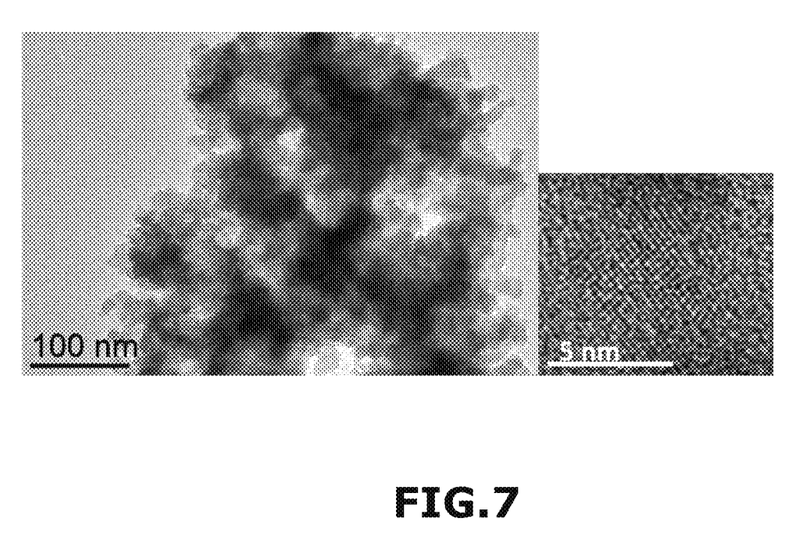
FIG. 7 is an image of the tin oxide nanoparticles by transmission electron microscopy from example 7, in accordance with one embodiment.

FIG. 7 represents an image of the tin oxide nanoparticles by transmission electron microscopy. The mean size diameter of the crystallized nanoparticles was less than 10 nm.

Example 8: Preparation of Copper Oxide Nanoparticles

In a glove box, a copper precursor $Cu_2[2,6\text{-}(i)Pr_2C_6H_3N)_2C(H)]_2$ (25.69 mg, 0.062 mmole) and dodecylamine (DDA, 2.3 mg, 0.2 equiv., 0.012 mmole) were dissolved in 5 ml of pentane in a dry Fisher Porter tube 10 so as to form a liquid phase. The resulting liquid phase was injected in a reacting chamber 2 through a liquid injector 6 and with the help of a pressurized tank 12 of argon set at 1.5 bar above the atmospheric pressure (i.e. 2.5 bar). Particular attention was taken to avoid any contact of the reactants with the ambient air by purging all the connected lines with argon. The pulsed liquid injection was controlled by an Injector Control Unit 9 with frequency of injection set at 1 Hz and an opening time of 5 ms. In parallel, water vapor (reacting gas) was introduced in the reacting chamber 2 through an inlet 4 by bubbling argon (carrier gas set at 1 bar) into a Fischer Porter Tube 13 containing 5 mL of water (reacting liquid). The temperature of the water was controlled by a heating circulator 16 that allows driving more or less water vapor in the reacting chamber 2. The temperature of the heating circulator was set at 60° C. The formation of tin oxide nanoparticles occurred in the reaction chamber 2 by hydrolysis of the tin organometallic precursor in contact with water vapor. The contact time between the water vapor and the tin precursor could be monitored by the nanoparticles injector 7. The pulsed of the nanoparticles injector 7 was controlled by the ICU 9 with a frequency of injection set at 1 Hz and an opening time of 10 ms. A colloidal solution of tin oxide particles in pentane was collected at the outlet 8 of the nanoparticles injector 7 and directly injected in a schlenk flask under an argon stream which is connected to the nanoparticles injector 7 via an adapter. The pressure at the outlet 8 of the nanoparticles injector 7 was equal to the atmospheric pressure.

The copper nanoparticles concentration of the solution was about $0.025 \text{ mol·l}^{-1}$ ($10^{19}$ nanoparticules·$ml^{-1}$).

Figure 8:
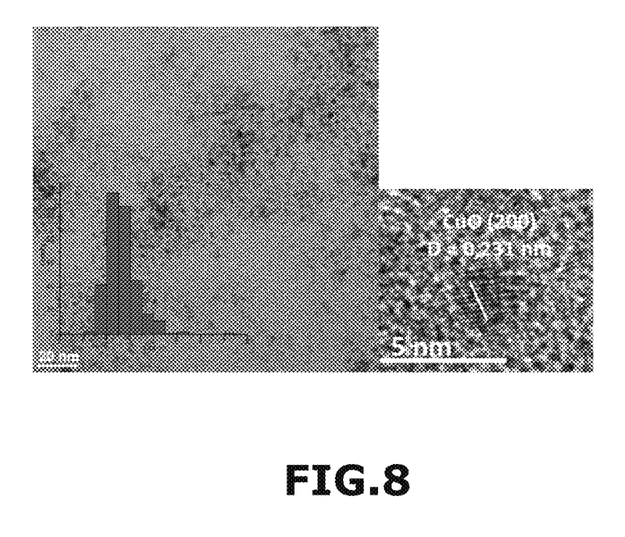
FIG. 8 is an image of the copper oxide nanoparticles by transmission electron microscopy, from example 8, in accordance with one embodiment.

FIG. 8 represents an image of the copper oxide nanoparticles by transmission electron microscopy. The mean size diameter of the copper oxide nanoparticles was 2±1 nm.

Example 9: Preparation of Tungsten Oxide Nanoparticles

In a glove box, a tungsten precursor W(NtBu)$_2$(NHtBu)$_2$ (58.73 mg, 0.125 mmole) and dodecylamine (DDA, 2.3 mg, 0.1 equiv., 0.012 mmole) were dissolved in 5 ml of pentane in a dry Fisher Porter tube 10 so as to form a liquid phase. The resulting liquid phase was injected in a reacting chamber 2 through a liquid injector 6 and with the help of a pressurized tank 12 of argon set at 2.5 bar above the atmospheric pressure (i.e. 3.5 bar). Particular attention was taken to avoid any contact of the reactants with the ambient air by purging all the connected lines with argon. The pulsed liquid injection was controlled by an Injector Control Unit 9 with frequency of injection set at 1 Hz and an opening time of 5 ms. In parallel, water vapor (reacting gas) was introduced in the reacting chamber 2 through an inlet 4 by bubbling argon (carrier gas set at 2 bar) into a Fischer Porter Tube 13 containing 5 mL of water (reacting liquid). The temperature of the water was controlled by a heating circulator 16 that allows driving more or less water vapor in the reacting chamber 2. The temperature of the heating circulator was set at 60° C. The formation of tin oxide nanoparticles occurred in the reaction chamber 2 by hydrolysis of the tin organometallic precursor in contact with water vapor. The contact time between the water vapor and the tin precursor could be monitored by the nanoparticles injector 7. The pulsed of the nanoparticles injector 7 was controlled by the ICU 9 with a frequency of injection set at 1 Hz and an opening time of 20 ms. A colloidal solution of Tungsten oxide particles in pentane was collected at the outlet 8 of the nanoparticles injector 7 and directly injected in a schlenk flask under an argon stream which is connected to the nanoparticles injector 7 via an adapter. The pressure at the outlet 8 of the nanoparticles injector 7 was equal to the atmospheric pressure.

Figure 9:
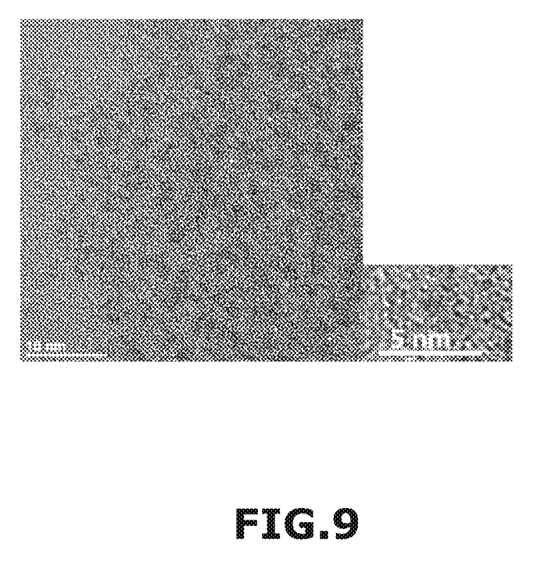
FIG. 9 is an image of the Tungsten oxide nanoparticles by transmission electron microscopy, from example 9, in accordance with one embodiment.

FIG. 9 represents an image of the Tungsten oxide nanoparticles by transmission electron microscopy. The mean size diameter of the crystallized nanoparticles was less than 10 nm.

The invention claimed is:

1. A method for the preparation of nanoparticles selected from the group consisting of metal nanoparticles, metal oxide nanoparticles and semiconductor nanoparticles,
   wherein said method is implemented in a device comprising:
   at least one reacting chamber including at least one first inlet for admission of said liquid phase in said reacting chamber, at least one second inlet for admission of said gas phase in said reacting chamber, and an outlet for expulsion of said nanoparticles from said reacting chamber,
   a liquid injector arranged upstream of the first inlet for injecting or spraying said liquid phase into said reacting chamber,
   an injector of nanoparticles arranged downstream of the outlet for injecting or spraying said nanoparticles through an outlet of said nanoparticles injector, and
   control means for controlling the injection or the spray of said liquid phase and/or said nanoparticles, and
   wherein said method comprises:
   a step 1) of injecting a liquid phase comprising at least one nanoparticles precursor selected from the group consisting of precursors of metals, precursors of metal oxides and precursors of semiconductors in said reacting chamber through said liquid injector,
   a step 2) of contacting said liquid phase with a gas phase comprising at least one carrier gas and at least one reacting gas, said step 2) being carried out in said reacting chamber,
   a step 3) of reacting the nanoparticles precursor with the reacting gas so as to form nanoparticles, and
   a step 4) of expulsion of the nanoparticles produced in step 3) from the reacting chamber through the nanoparticles injector, said nanoparticles being under the form of an aerosol at the outlet of the nanoparticles injector.

2. The method according to claim 1, wherein the nanoparticles precursor used in step 1) is either liquid at ambient temperature or dissolved in a solvent so as to form a liquid phase at ambient temperature.

3. The method according to claim 1, wherein the liquid phase further comprises at least one stabilizing agent.

4. The method according to claim 1, wherein the device further comprises a tank $T^1$ for containing the liquid phase, said tank $T^1$ being connected by a conduit or a supply line to the first inlet of the reacting chamber.

5. The method according to claim 4, wherein the tank $T^1$ is connected to a tank $T^2$ of pressurized gas, so as to enable the introduction of the pressurized gas through the upper portion of the tank $T^1$.

6. The method according to claim 5, wherein the pressure $P^2$ in the tank $T^2$ is at least 1.5 bar above the atmospheric pressure.

7. The method according to claim 4, wherein said method comprises prior to step 1), a step i) of preparing the liquid phase in the tank $T^1$.

8. The method according to claim 1, wherein the control means control the flow rate of the liquid injector and during step 1) the duration of the opening of the liquid injector ranges from 1 ms to 20 ms.

9. The method according to claim 1, wherein during step 1), the frequency of the injection of the liquid injector can range from 1 Hz to 50 Hz.

10. The method according to claim 1, wherein the device further comprises a tank $T^3$ for containing the gas phase and possibly a reacting liquid, said tank $T^3$ being connected by a conduit or a supply line to the second inlet of the reacting chamber.

11. The method according to claim 10, wherein the tank $T^3$ is connected to a tank $T^4$ for containing the carrier gas.

12. The method according to claim 11, wherein the pressure in the tank $T^4$ is at least equal to a pressure $P^4$=Pressure in the tank $T^2$-0.5 bar.

13. The method according to claim 10, wherein said method comprises prior to step 2), a step i') of preparing the gas phase in the tank $T^3$ and a step ii') of introducing the gas phase in the reacting chamber through the second inlet.

14. The method according to claim 1, wherein during step 4) the duration of the opening of the nanoparticles injector ranges from 1 ms to 20 ms.

15. The method according to claim 1, wherein during step 4), the frequency of the injection of the nanoparticles injector ranges from 1 Hz to 50 Hz.

16. The method according to claim 1, wherein step 3) is a chemical reaction involving the reaction of an organometallic compound with water.

17. A method for the preparation of a nanocomposite material comprising nanoparticles and at least one matrix material, wherein the method comprises at least the following steps:
- A) a step of preparing nanoparticles according to the method as defined in claim 1,
- B) a step of dispersing said nanoparticles with a matrix material or a precursor of a matrix material, and
- C) a step of producing the nanocomposite material, and wherein step B) is carried out either in the reacting chamber of the device or in a process chamber which is connected to the outlet of the nanoparticles injector of the device.

18. The method according to claim 17, wherein step C) is chosen from a polymerization step, a deposition step, a sol-gel process, any conventional plastic forming step and a mixture thereof.

19. A device comprising:
- at least one reacting chamber including at least one first inlet for admission of a liquid phase comprising at least one nanoparticles precursor selected from the group consisting of precursors of metals, precursors of metal oxides and precursors of semiconductors in said reacting chamber,
- at least one second inlet for admission of a gas phase comprising at least one carrier gas and at least one reacting gas in said reacting chamber, and
- an outlet for expulsion of nanoparticles selected from the group consisting of metal nanoparticles, metal oxide nanoparticles and semiconductor nanoparticles from said reacting chamber, wherein
- a liquid injector is arranged upstream of the first inlet for injecting or spraying said liquid phase into said reacting chamber,
- a nanoparticles injector is arranged downstream of the outlet for injecting or spraying said nanoparticles through an outlet of said nanoparticles injector, and
- a control means is configured to control the injection or the spray of said liquid phase and/or said nanoparticles, for the preparation of said nanoparticles or of a nanocomposite material, by contacting in the reacting chamber of the device the liquid phase comprising the at least one nanoparticles precursor with the gas phase comprising the at least one carrier gas and the at least one reacting gas.

\* \* \* \* \*